United States Patent [19]
Lane, Jr.

[11] Patent Number: 5,899,494
[45] Date of Patent: May 4, 1999

[54] DEFLAGRATION VENTING SYSTEM FOR AIRBAG SYSTEMS

[75] Inventor: Wendell C. Lane, Jr., Romeo, Mich.

[73] Assignee: Breed Automotive Technology, Inc., Lakeland, Fla.

[21] Appl. No.: 08/933,200

[22] Filed: Sep. 18, 1997

[51] Int. Cl.⁶ ............................................. B60R 21/28
[52] U.S. Cl. ................................... 280/739; 280/742
[58] Field of Search ............................. 280/739, 738, 280/742, 735

[56] References Cited

U.S. PATENT DOCUMENTS

| | | | |
|---|---|---|---|
| 3,747,953 | 7/1973 | Goes et al. | 280/739 |
| 5,217,244 | 6/1993 | Bauer | 280/732 |
| 5,388,860 | 2/1995 | Brede et al. | 280/739 |
| 5,518,269 | 5/1996 | Storey et al. | 280/739 |
| 5,709,405 | 1/1998 | Saderholm et al. | 280/739 |
| 5,743,558 | 4/1998 | Seymour | 280/739 |

*Primary Examiner*—Paul N. Dickson
*Attorney, Agent, or Firm*—Markell Seitzman

[57] ABSTRACT

An airbag module (10) employing a deflagration venting system (40) for adaptively changing the level of venting provided during airbag inflation is disclosed. The adaptively controlled airbag system (10) includes an airbag (12) in fluid communication with an airbag inflator (18). A manifold (16) is provided for directing the output of the airbag inflator (18) into the airbag (12), and a reaction canister (22) houses the airbag (12), the airbag inflator (18), and the manifold (16). A deflagration device (40) is provided for selectively venting the airbag module (10). The deflagration device (40) may be activated for creating at least one variable shaped vent (50, 52) for regulating output from the airbag inflator (18) and adaptively changing the deployment force of the airbag (12).

19 Claims, 3 Drawing Sheets

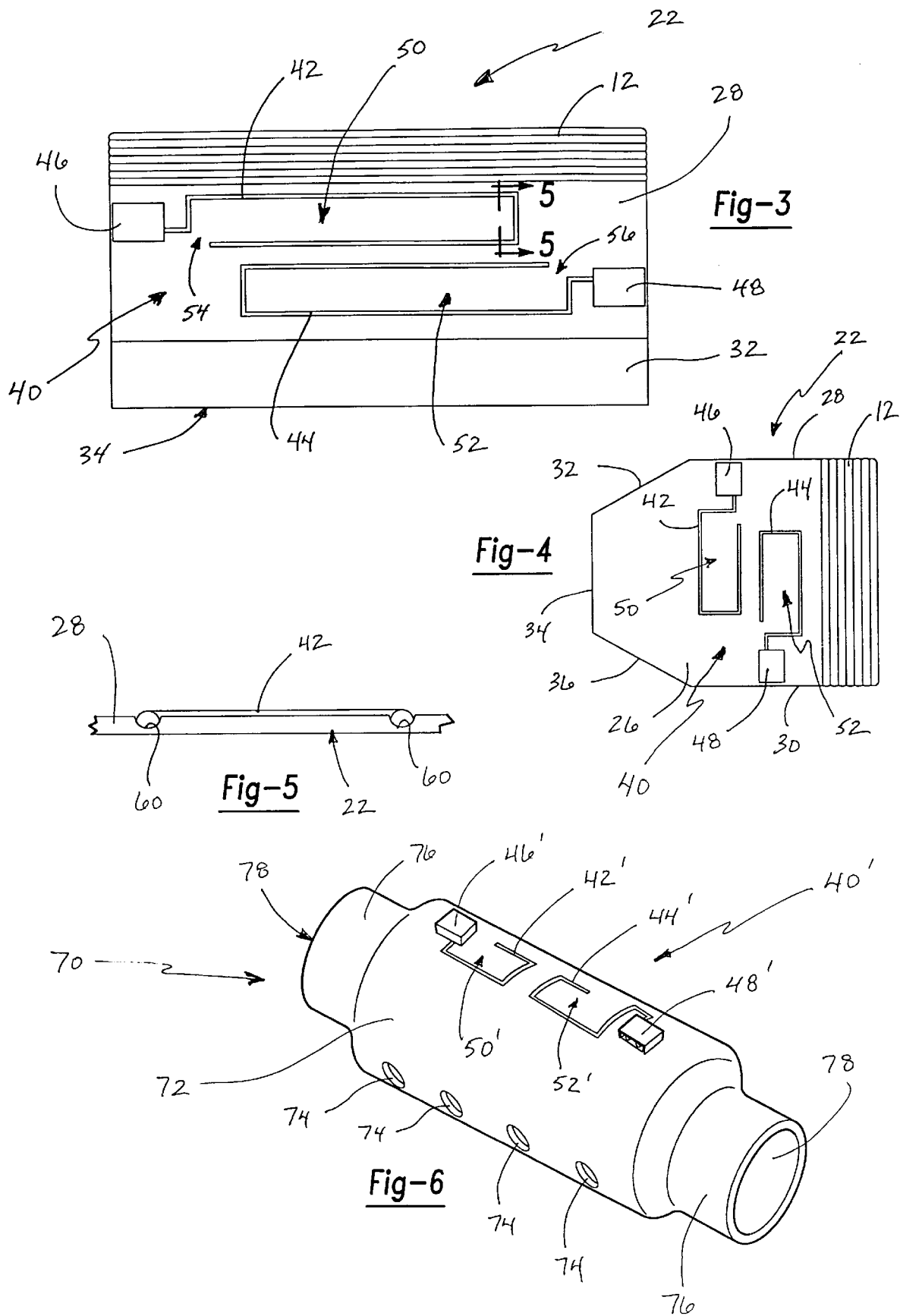

DEFLAGRATION VENTING SYSTEM FOR AIRBAG SYSTEMS

BACKGROUND OF THE INVENTION

1. Technical Field

The present invention relates to an adaptive safety restraint system, and more particularly to an airbag module employing a deflagration venting system for adaptively changing the level of venting provided during airbag inflation.

2. Discussion

The use of airbag systems for protecting a vehicle occupant in crash situations is well known within the prior art. To promote occupant safety in a variety of crash scenarios, vehicles are being outfitted with different types of airbag and safety restraint systems. For example, a vehicle may include airbags positioned in front of the seat occupant as well as airbags positioned along the door side of the seat occupant. The vehicle may also include inflatable knee bolsters for providing additional protection to the seat occupant, and seat belt pretensioners for taking up any slack in a properly fastened seat belt.

These first generation airbag and safety restraint systems are typically driven by individual inflators having a stored energy device which is activated by the vehicle's crash detection system. Typically, actuation of the inflator generates a predetermined output, based on the magnitude of gas or propellant discharge, for driving its associated airbag or safety restraint device. However, a vehicular collision producing less impact force does not require the same amount of airbag inflation to absorb the energy transferred to the seat occupant as a vehicular collision producing greater impact force. Accordingly, this desire for adaptive airbag systems has prompted investigation into regulating the output of an airbag inflator, and thus the deployment force of the airbag.

One method for regulating the output of the airbag inflator is through the use of a multi-level inflator having two or more separate stored energy devices. Typically, the multi-level inflator includes a first stored energy device associated with a smaller propellant chamber and a second stored energy device associated with a larger propellant chamber, each of which can be independently activated. In response to a relatively minor crash, only the first stored energy device is activated for inflating the airbag. Likewise, in a more severe crash, only the second stored energy device is activated. However, in a high severity crash, both stored energy devices are simultaneously activated for providing maximum inflator output. This same multi-level inflator approach can alternatively be used for regulating inflator output in response to the size of the vehicle occupant, if used in conjunction with the appropriate occupant detection sensors. However, multi-level inflators are expensive to produce because two separate inflation gas sources must be integrated into a single unit. Moreover, even if only one of the chambers is discharged, the entire inflator must still be replaced.

SUMMARY OF THE INVENTION

Accordingly, the present invention is directed to a system for controlling the rate at which an airbag is filled by controllably venting the output generated by the single-level inflator. This objective may be achieved by applying a deflagration system to one or more of the components within the airbag module. Such an approach would obviate the need for multi-level airbag inflators.

The deflagration system includes an electrically actuated deflagration device for cutting vent passages into the metal or plastic components of the airbag module for venting the gases produced by the inflator, thereby modifying the deployment force. The vent passages may be cut through the reaction canister, the manifold, or other components including the airbag inflator. In addition, one or more deflagration devices can be applied to the airbag components for selectively cutting one or more venting passages for adaptively changing the level of venting. Accordingly, each deflagration device can be provided with a separate electrical connector which is then tied into the vehicle's crash management control system.

Thus, the present invention is intended to overcome several of the problems experienced in the prior art by providing an airbag module employing a deflagration venting system for adaptively changing the level of venting provided during airbag inflation. The adaptively controlled airbag system includes an airbag in fluid communication with an airbag inflator. An optional manifold is provided for directing the output of the airbag inflator into the airbag. A reaction canister (or housing) houses the airbag, the airbag inflator, and the manifold (if used). The deflagration system is designed for selectively venting the airbag module. The deflagration system may be activated for creating at least one variable shaped vent passage for regulating output from the airbag inflator and adaptively changing the deployment force of the airbag.

BRIEF DESCRIPTION OF THE DRAWINGS

The various advantages of the present invention will become apparent to one skilled in the art by reading the following specification and appended claims, and by referencing the following drawings in which:

FIG. 3 is a top plan view of the reaction canister shown in FIG. 2;

FIG. 4 is a side elevation view of the reaction canister shown in FIG. 2 also associated with a preferred embodiment of the present invention;

FIG. 5 is a cross-sectional view taken along line 5—5 of FIG. 3 showing an exemplary deflagration cord situated within deformations in the reaction canister;

FIG. 6 is a perspective view of an airbag manifold according to a second preferred embodiment of the present invention;

DETAILED DESCRIPTION OF THE PREFERRED EMBODIMENTS

Figure 1:
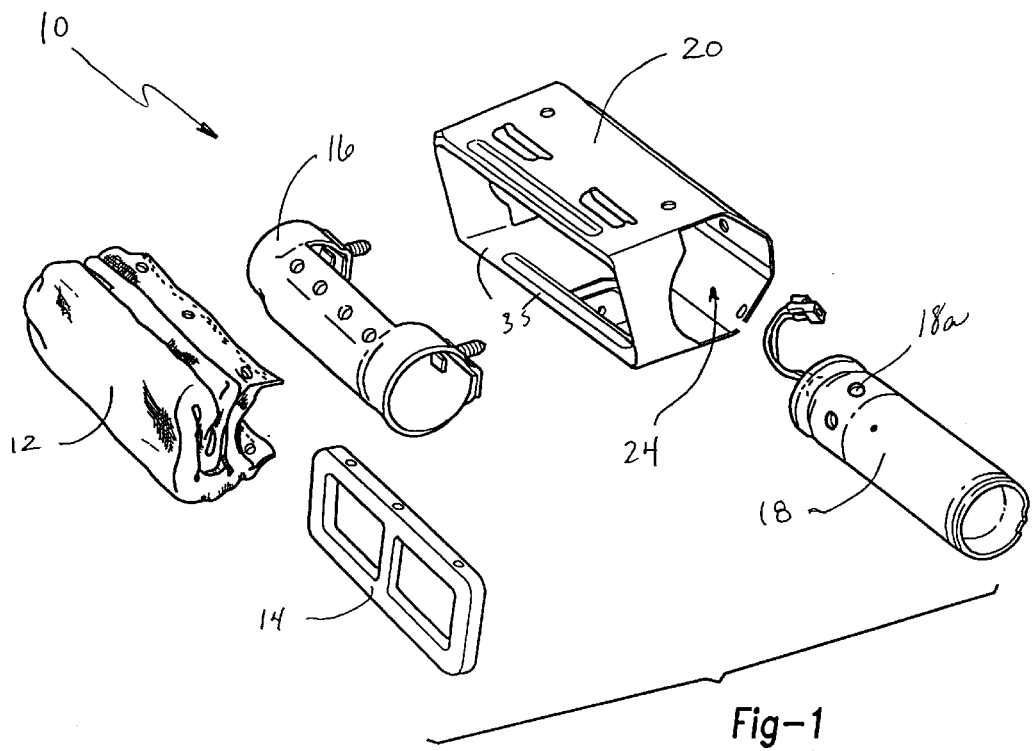
FIG. 1 is an exploded perspective view of an exemplary airbag inflator system for use in accordance with the preferred embodiments of the present invention.

The present invention is directed to a low cost airbag inflator which utilizes a deflagration device or deflagration cord for adaptively controlling the output of the inflator. Referring now to FIG. 1, an exemplary airbag module assembly 10 is shown in accordance with the present invention. The airbag module assembly 10 includes an airbag 12

(shown in its folded configuration), an optional airbag mounting ring or plate 14, a manifold 16, an inflator 18 having a plurality of exit ports 18a, and a reaction canister 20. While not specifically shown, inflator 18 is inserted within manifold 16, and the assembly is then secured within reaction canister (or housing) 20. Airbag module 10 is completed by fastening airbag 12 to mounting ring 14, which is then secured to the open, front face of reaction canister 20. As is known in the art the airbag can be secured directly to the manifold or to the inflator in which case the air bag would reside within the body of the reaction canister. This will typically depend upon the type of inflator used. While not shown, a deployment cover is typically used to enclose the reaction canister 20 and protect the airbag.

Figure 2:
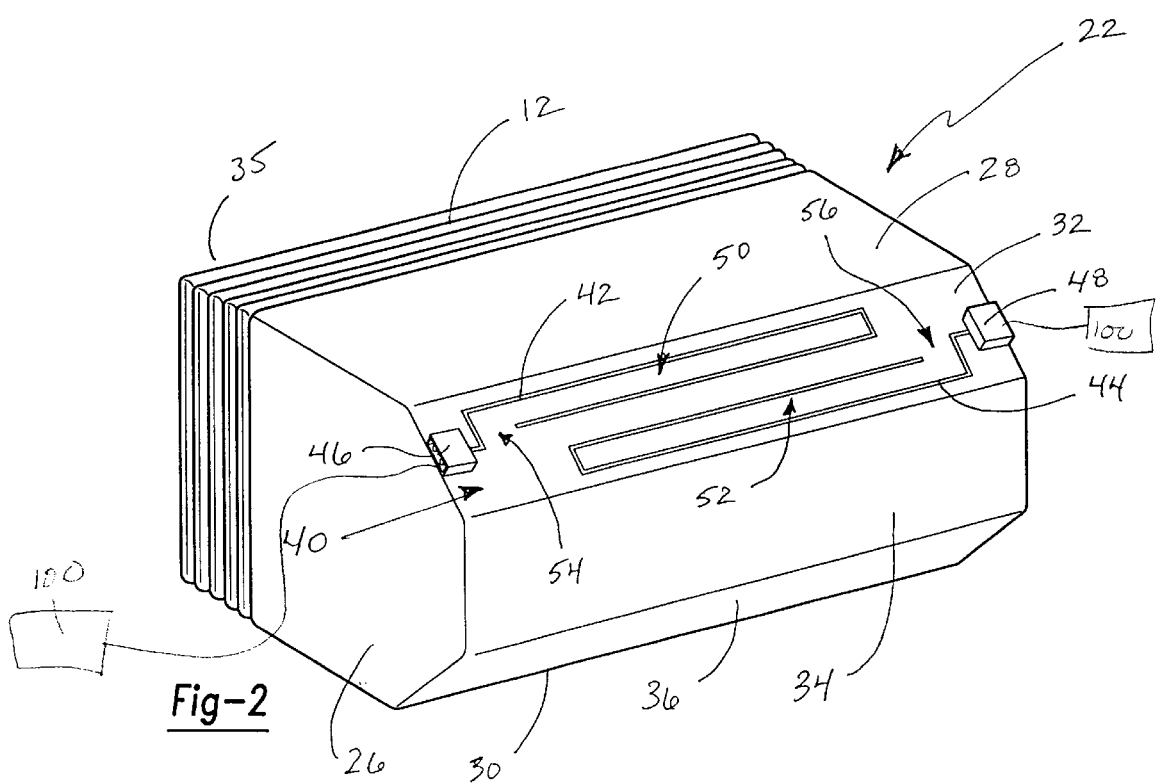
FIG. 2 is a perspective view of an exemplary reaction canister which may be utilized in accordance with a first preferred embodiment of the present invention.

FIG. 2 illustrates the back side of a similar reaction canister 22 associated with the preferred embodiment of the present invention. Reaction canister 22 can take on a variety of shapes and configurations without deviating from the scope of the invention. For example, reaction canister 20 (FIG. 1) is shown having open sides 24 to permit the inflator 18 to be inserted into the reaction canister after the manifold 16 is secured therein. Alternatively, reaction canister 22 (FIG. 2) is disclosed as having closed sides 26. Preferably, reaction canister 20, 22 is stamped, molded or extruded from a lightweight metal, such as, but not limited to aluminum, for providing a low cost housing which may be easily cut or burned through by a deflagration device for creating the requisite vent passages. However, reaction canister 20, 22 may also be formed from a plastic composite which will work with a deflagration system. As will be apparent from the description below, the deflagration device will produce intense heat which will burn a hole in for example the reaction canister to controllably vent or divert a portion of the inflation gas (produced by the inflator 18) away from the airbag to control the volume of gas entering into the airbag and hence control the inflation rate of the air bag and the amount to which the airbag will be filled. As can be appreciated, if the local wall thickness of the reaction can (or other system component) proximate the location of the deflagration device is sufficiently thick the hole (or opened path) produced by the burning of the deflagration device will not cause any deformation of the reaction can.

Similarly, if the reaction can (or other system component receiving the deflation device is sufficiently thin, and the interior of the reaction can becomes pressurized, the hole or open path produced by the activation of the deflagration device will weaken the reaction can (or other system component) so that that portion of the reaction can adjacent to the hole or open path will bend outwardly defining an enlarged vent through which the inflation gas will be diverted away from the airbag.

Reaction canister 22 is a box-like structure having side walls 26, top wall 28, bottom wall 30, upper rear wall 32, middle rear wall 34, and lower rear wall 36 each of which cooperate to define an open end, mouth or forward opening 35. The folded airbag 12' is shown secured to the forward opening of the reaction canister. FIG. 2 shows upper rear wall 32 as having a deflagration venting system 40 applied thereto. As disclosed, deflagration venting system 40 includes one or more deflagration devices, such as a first deflagration cord 42 and a second deflagration cord 44. One end of deflagration cord 42 is connected to an electrically activated ignition device or ignitor 46 which generates heat or a spark to activate the deflagration device(s). Likewise, one end of deflagration cord 44 is connected to another ignition device 48. The ignition devices 46 and 48 are in electrical communication with the vehicle's crash management controller (CMC) 100. The CMC generates activation signals which are received by the each ignition device. Deflagration is generally defined as a chemical reaction accompanied by the vigorous production of heat, flame or sparks. Upon activation, the deflagration cord can burn through material at ultra-high speed, to provide an escape passage. The typical deflagration cord can burn or cut completely through the material within milliseconds, thus facilitating rapid escape. Deflagration cords are well known in the art and need not be described in any detail.

The outline or shape of each deflagration cord 42, 44 defines a venting area 50, 52 respectively, which provides an escape passage for the inflator gasses to travel through when either or both of deflagration cords 42, 44 are activated. As will be discussed in more detail below, venting areas 50, 52 may be similarly sized (as shown), or may be differently sized, as defined by the outline of deflagration cords 42, 44. Moreover, deflagration cords 42, 44 may define a rectangular venting area, such as venting areas 50, 52, or a straight line venting slit (not shown). If venting areas 50, 52 are rectangular in shape, the material covering the venting areas 50, 52 will be displaced from upper rear wall 32 upon activation of airbag inflator 18. However, portions 54 and 56 will prevent the material forming venting areas 50, 52 from becoming separated from the upper rear wall 32.

Referring now to FIG. 3, a variation of deflagration system 40 is shown. More specifically, FIG. 3 discloses deflagration system 40 applied to top wall 28 of reaction canister 22 as opposed to the upper rear wall 32. In a similar fashion, FIG. 4 discloses that the deflagration system 40 may instead be applied to the side wall 26 of reaction canister 22. As will be appreciated, deflagration system 40 may be located along any of the flat surfaces of reaction canister 22. Accordingly, the location of deflagration system 40 defines the position of venting areas 50, 52 which are burned into reaction canister 22 upon activation of deflagration cords 42, 44. As such, the position of venting areas 50, 52 can be customized for the particular vehicle in which airbag module 10 is installed.

With reference to FIG. 5, a partial cross-section of top wall 28 of reaction canister 22 and deflagration cord 42 is illustrated. Prior to applying deflagration cord 42 to reaction canister 22, a channel 60 may be formed in top wall 28 for receiving deflagration cord 42. Preferably, channel 60 is formed during the stamping or molding process and has a predetermined depth. However, a variety of methods may be used for forming channel 60. Once channel 60 is formed into the appropriate shape and depth, deflagration cord 42 is secured therein. The primary purpose for channel 60 is to provide a weakened area of thinner metal or plastic for allowing deflagration cord 42 to quickly burn through. While not specifically shown, second deflagration cord 44 is applied within a similar channel formed on the surface of reaction canister 22.

Figure 7:
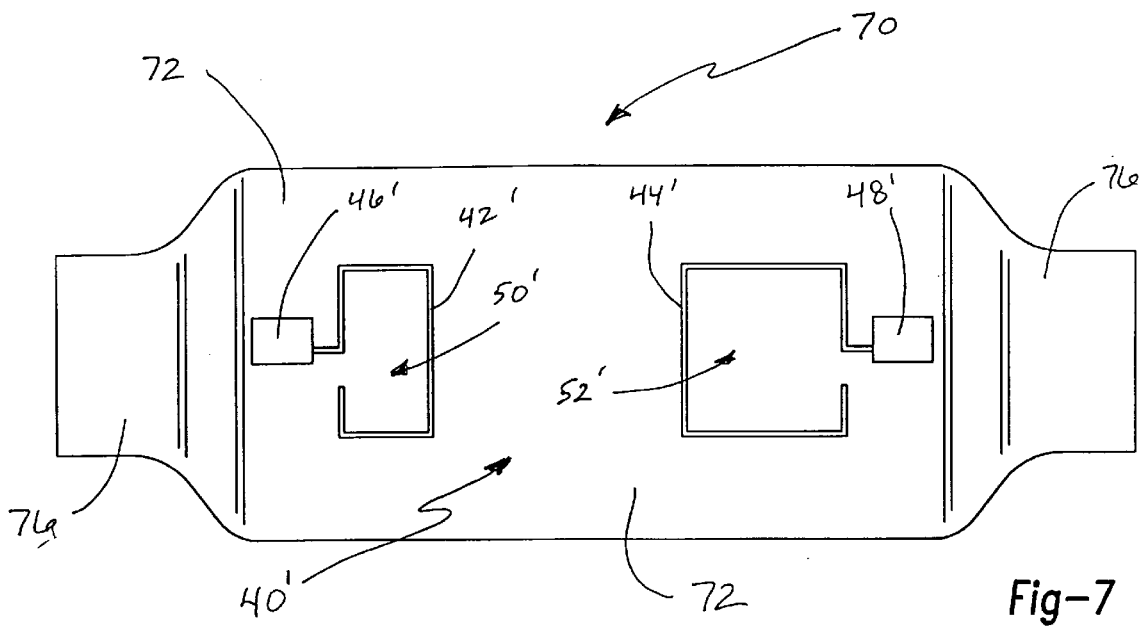
FIG. 7 is a rear elevation view of the airbag manifold shown in FIG. 5.

Turning now to FIGS. 6 and 7, an exemplary airbag manifold 70 which is suitable for use with the deflagration system of the present invention is shown. Airbag manifold 70 includes a cylindrical main body 72 having a plurality of circular apertures 74 formed therein. Apertures 74 direct the inflator gases into airbag 12 during inflation. Each end of main body 72 tapers into a cylindrical end portion 76 which form circular openings 78. As disclosed, the inside diameter of openings 78 are sized for receiving a cylindrical inflator, such as inflator 18, to create a generally airtight seal.

As described with reaction canister 22, airbag manifold 70 also includes a deflagration system 40' applied to main body 72. Deflagration system 40' also includes a first deflagration cord 42' and a second deflagration cord 44'. Each deflagration cord 42', 44' includes a separate electrical ignitor 46', 48' respectively, for connection with the vehicle's crash management controller. Preferably, deflagration system 40' may be applied directly opposite apertures 74 on main body 72 or other location which permits the inflation gas to be vented away from the airbag while insuring that this vented inflation gas is also directed away from any occupant. Additionally, although not specifically shown, deflagration system 40' is applied within a series of channels formed within main body 72, which are similar to channels 60 illustrated in FIG. 5.

With specific reference to FIG. 7, a variation on the pattern of deflagration cords 42' and 44' is shown. More specifically, venting area 50' defined by deflagration cord 42' is shown to be smaller than venting area 52' defined by deflagration cord 44'. This feature allows two differently sized venting areas 50', 52' to be formed within main body 72. In operation, smaller venting area 50' can be created by only activating deflagration cord 42' while a larger venting area 52' can be created by only activating deflagration cord 44'. In a similar fashion, the maximum size venting area can be created by simultaneously activating deflagration cords 42' and 44'.

Figure 8:
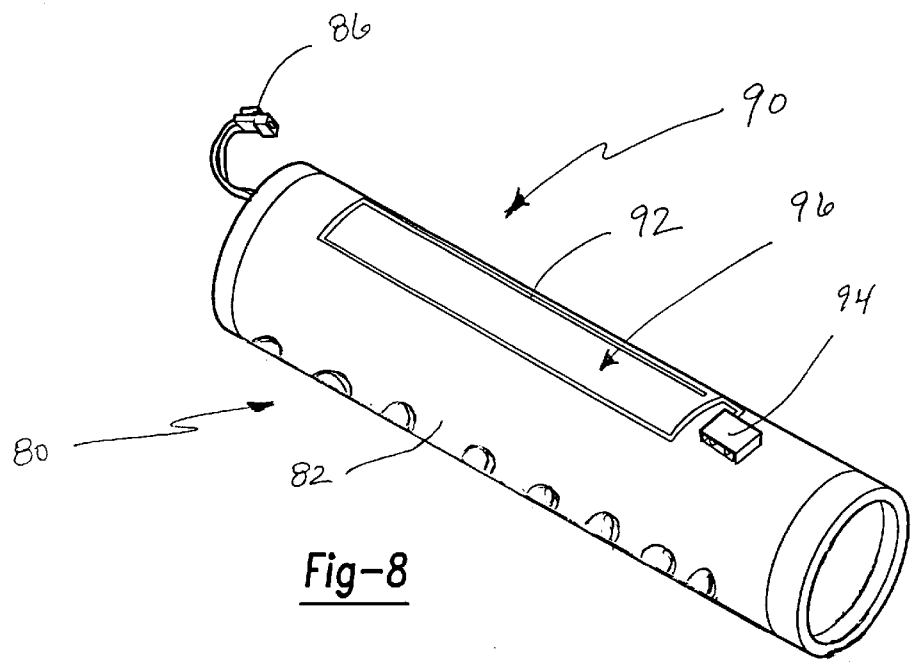
FIG. 8 is a perspective view of an exemplary cylindrical inflator for use with a third preferred embodiment of the present invention.

Referring now to FIG. 8, an alternate arrangement for the deflagration venting system of the present invention is disclosed. FIG. 8 illustrates an airbag inflator 80 having a generally cylindrical body 82. The body 82 of the inflator 80 includes a plurality of discharge apertures 84 for directing the primary output of the inflator gases into the adjacent airbag. The inflator 80 also includes an electrical connector 86 for receiving the inflator activation signal from the vehicle's crash management controller (CMC) 100. A deflagration system 90 is also applied to inflator 80. In a similar fashion described above, deflagration system 90 includes one or more deflagration devices, such as deflagration cord 92, having an electrical ignitor 94 applied to the outer surface of airbag inflator 80. As such, deflagration cord 92 defines a venting area 96 which provides a vent passage for the inflation gases upon activation of deflagration cord 92. While deflagration cord 92 defines a rectangular venting area 96, it should be understood that various other patterns are within the scope of the present invention. More specifically, deflagration cord 92 may be applied in a straight line fashion for producing a venting slit (not shown). Alternatively, deflagration cord 92 may be applied in a serpentine pattern for producing a slightly larger or longer venting area. Also, deflagration system 90 could further include a second deflagration cord for variable vent control similar to that disclosed with systems 40 and 40'.

While deflagration systems 40-40' and 90 have been illustrated as being applied to the various components of airbag module 10, the operation of each variation of the deflagration system is substantially similar. For example, in a typical crash scenario, the vehicle's crash management controller determines the severity of the impact, and activates the appropriate safety restraint devices. If the crash management controller determines that the deployment force of one or more of the adaptive airbags must be modified in accordance with the severity of the crash, the seating position of the occupant (that is if the occupant is in a normally seated position or out of position), the size of the occupant, or the presence of a child safety seat, the controller may selectively activate the deflagration venting system for adaptively changing the level of venting provided during airbag inflation. More specifically, this involves providing an electrical signal to one or more of the deflagration cords applied to airbag module 10. Upon electrical activation, one or more of the deflagration cords will begin its chemical reaction for instantaneously burning or cutting through the material to which it is applied. The typical and preferred time for burning the venting area into the material is within 2–5 milliseconds. As such, the appropriately sized venting area or areas can be created for venting the inflator gases discharged by the inflator, and controlling the output generated by the inflator and communicated to the airbag.

In operation, when the controller detects a smaller vehicle occupant or a minor impact force, one of the deflagration cords may be activated lowering the deployment force of airbag 12. Alternatively, in a severe crash situation, or if a larger vehicle occupant is detected, the controller may activate both deflagration devices (cords) simultaneously or in series for providing maximum airbag deployment. Moreover, depending upon the activation time and shape of the individual deflagration cords, the material displaced may only move slightly, or may be completely forced away from the venting area.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. An adaptively controlled airbag system (10) comprising:
    an airbag (12);
    an airbag inflator (18) in fluid communication with the airbag (12);
    a housing (22) for housing the airbag (12), the airbag inflator (18) for producing inflation gases to inflate the airbag; and
    deflagration device means (40) for selectively venting a portion of the inflation gas away from the airbag and for creating a vent (50, 52) for adaptively changing the deployment force of the airbag (12);
    wherein the deflagration device means (40) includes at least one electronically activated deflagration cord (42) secured to the airbag system (10).

2. The airbag system of claim 1 wherein the deflagration cord (42) defines a rectangular venting area (50).

3. The airbag system of claim 1 wherein the deflagration cord (44) defines a venting slit (52).

4. An adaptively controlled airbag system (10) comprising:
    an airbag (12);
    an airbag inflator (18) in fluid communication with the airbag (12);
    a housing (22) for housing the airbag (12), the airbag inflator (18) for producing inflation gases to inflate the airbag; and
    deflagration device means (40) for selectively venting a portion of the inflation gas away from the airbag and for creating a vent (50, 52) for adaptively changing the deployment force of the airbag (12);
    wherein the deflagration device means (40) is applied to the housing (22).

5. An adaptively controlled airbag system (10) comprising:
    an airbag (12);

an airbag inflator (18) in fluid communication with the airbag (12);

a housing (22) for housing the airbag (12), the airbag inflator (18) for producing inflation gases to inflate the airbag; and deflagration device means (40) for selectively venting a portion of the inflation gas away from the airbag and for creating a vent (50, 52) for adaptively changing the deployment force of the airbag (12);

wherein inflator is fitted within a manifold (70) and wherein the deflagration device means (40) is applied to the manifold (70).

6. An adaptively controlled airbag system (10) comprising:

an airbag (12);

an airbag inflator (18) in fluid communication with the airbag (12);

a housing (22) for housing the airbag (12), the airbag inflator (18) for producing inflation gases to inflate the airbag; and deflagration device means (40) for selectively venting a portion of the inflation gas away from the airbag and for creating a vent (50, 52) for adaptively changing the deployment force of the airbag (12);

wherein the deflagration device means (40) is applied to the airbag inflator.

7. An adaptively controlled airbag system (10) comprising:

an airbag (12);

an airbag inflator (18) in fluid communication with the airbag (12);

a housing (22) for housing the airbag (12), the airbag inflator (18) for producing inflation gases to inflate the airbag; and deflagration device means (40) for selectively venting a portion of the inflation gas away from the airbag and for creating a vent (50, 52) for adaptively changing the deployment force of the airbag (12);

wherein the deflagration device means (40) includes an electrical connection means (46) for providing electrical communication with a crash management controller.

8. An adaptively controlled airbag system (10) comprising:

an airbag (12);

an airbag inflator (18) in fluid communication with the airbag (12);

a housing (22) for housing the airbag (12), the airbag inflator (18) for producing inflation gases to inflate the airbag; and deflagration device means (40) for selectively venting a portion of the inflation gas away from the airbag and for creating a vent (50, 52) for adaptively changing the deployment force of the airbag (12);

wherein the deflagration device means (40) includes a first electronically activated deflagration cord (42) having a predefined shape, and a second electronically activated deflagration cord (44) having a predetermined shape which is different from the first deflagration cord (42).

9. An adaptively controlled airbag system for controlling the deployment force of an airbag module (10) comprising:

an airbag (12);

an airbag inflator (18) in fluid communication with the airbag (12);

a manifold (16) for directing the output of the airbag inflator (18) into the airbag (12);

a reaction canister (22) for housing the airbag (12), the airbag inflator (18), and the manifold (16); and at least one electronically activated deflagration cord (42) secured within a channel (60) formed in the reaction canister (22);

whereby the at least one deflagration cord (42) may be selectively activated by a crash management controller (100) for creating at least one variable shaped vent (50) for regulating output from the airbag inflator (18) and adaptively changing the deployment force of the airbag (12).

10. The airbag system of claim 9 wherein the deflagration cord (42) includes an electrical connection means (46) for communication with the crash management controller.

11. The airbag system of claim 9 wherein the deflagration cord (42) defines a rectangular venting area (50).

12. The airbag system of claim 9 wherein the deflagration cord (44) defines a venting slit (52).

13. The airbag system of claim 9 wherein the at least one electronically activated deflagration cord (42) includes a first deflagration cord (42) and a second deflagration cord (44) which may be independently activated.

14. The airbag system of claim 13 wherein the first deflagration cord (42) defines a first predetermined venting area (50), and the second deflagration cord (44) defines a predetermined venting area (52) which is smaller than the first predetermined venting area (50).

15. An adaptively controlled airbag system having a selectively activated venting system (40) for controlling the deployment force of an airbag module (10) comprising:

an airbag (12) in fluid communication with an airbag inflator (18);

a housing (22) for housing the airbag (12), the airbag inflator (18), the housing (22) including a wall portion (32) for accommodating the venting system (40); and a first electronically activated deflagration cord (42) and a second electronically activated deflagration cord (44) secured to the wall portion (32) of the housing (22);

whereby the first and second deflagration cords (42, 44) may be selectively activated by a crash management controller (100) for burning a plurality of venting areas (50, 52) into the wall portion (32) and creating the venting system (40) for regulating the amount of inflation gas communicated to the airbag and adaptively changing the deployment force of the airbag (12).

16. The airbag system of claim 15 wherein the first and second deflagration cords (42, 44) are secured within a pair of channels (60) formed in the housing (22).

17. The airbag system of claim 15 wherein the first deflagration cord (42) and the second deflagration cord (44) may be independently activated.

18. The airbag system of claim 15 wherein the first deflagration cord (42) defines a first predetermined venting area (50), and the second deflagration cord (44) defines a predetermined venting area (52) which is smaller than the first predetermined venting area (50).

19. The airbag system of claim 15 wherein one of the first deflagration cord (42) and the second deflagration cord (44) defines a rectangular venting area (50).

* * * * *

UNITED STATES PATENT AND TRADEMARK OFFICE
CERTIFICATE OF CORRRECTION

PATENT NO. : 5,899,494
DATED : May 4, 1999
INVENTOR(S) : Wendell C. Lane, Jr.

It is certified that error appears in the above-identified patent and that said Letters Patent is hereby corrected as shown below:

On title page, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 4 | 1 | 3 | 3 | 7 | 8 | 5/9/95 | Steffens, Jr. et al | | |
| | | 5 | 3 | 6 | 6 | 2 | 4 | 2 | 11/22/94 | Faigle et al. | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | GB | 2 | 3 | 0 | 6 | 4 | 0 | 9 A | 5/7/97 | UK | | | |
| | WO | 98/ | 1 | 5 | 4 | 3 | 4 | | 4/16/98 | PCT | | | |

Signed and Sealed this

Twelfth Day of December, 2000

*Attest:*

Q. TODD DICKINSON

*Attesting Officer*       *Director of Patents and Trademarks*